United States Patent
Boudet et al.

(10) Patent No.: US 11,230,261 B2
(45) Date of Patent: Jan. 25, 2022

(54) COMPUTER FOR ACTIVATING AT LEAST ONE FUNCTION OF A MOTOR VEHICLE

(71) Applicant: Continental Automotive GmbH, Hannover (DE)

(72) Inventors: Cédric Boudet, Toulouse (FR); Xavier Bressan, Toulouse (FR); Christophe Grisey, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/143,568

(22) Filed: Jan. 7, 2021

(65) Prior Publication Data

US 2021/0221330 A1 Jul. 22, 2021

(30) Foreign Application Priority Data

Jan. 17, 2020 (FR) ...................................... 2000453

(51) Int. Cl.
*B60R 25/24* (2013.01)
*B60R 16/03* (2006.01)
*B60R 16/037* (2006.01)
*B60R 25/31* (2013.01)

(52) U.S. Cl.
CPC ............ *B60R 25/245* (2013.01); *B60R 16/03* (2013.01); *B60R 16/037* (2013.01); *B60R 25/31* (2013.01)

(58) Field of Classification Search
CPC ..... B60R 25/245; B60R 16/03; B60R 16/037; B60R 25/31
See application file for complete search history.

(56) References Cited

U.S. PATENT DOCUMENTS

| | | | | |
|---|---|---|---|---|
| 2012/0244877 | A1* | 9/2012 | Margalef | ................. H04Q 9/00 455/456.1 |
| 2017/0321960 | A1* | 11/2017 | Favila | ................... F25D 29/008 |
| 2019/0266821 | A1* | 8/2019 | Balakrishna | ........ B60R 25/1001 |
| 2019/0309564 | A1 | 10/2019 | Mitchell et al. | |
| 2020/0086785 | A1* | 3/2020 | Lee | ........................... B60Q 9/00 |
| 2020/0157873 | A1* | 5/2020 | Sabatini | ................. B60Q 1/323 |

FOREIGN PATENT DOCUMENTS

| | | |
|---|---|---|
| EP | 2070780 A2 | 6/2009 |
| EP | 3312061 B1 | 12/2019 |
| FR | 3078042 A1 | 8/2019 |

OTHER PUBLICATIONS

French Search Report and Written Opinion for French Application No. FR2000453, dated Sep. 25, 2020, 7 pages.

* cited by examiner

*Primary Examiner* — Thomas D Alunkal
(74) *Attorney, Agent, or Firm* — RatnerPrestia

(57) ABSTRACT

A computer for activating at least one function of a motor vehicle from a portable authentication device, the vehicle including: a plurality of opening elements, a plurality of communication modules, each communication module being mounted in an opening element of the vehicle, a fixed reference module, the computer being configured to: determine the opening position of the at least one opening element detected in the open state, determine an inner detection zone, located in the passenger compartment of the vehicle, and an outer detection zone of the antenna, located outside the vehicle, from the determined opening position, calculate the position of the device, and activate at least one function of the vehicle when the authentication device is located in the inner detection zone of said opening element.

10 Claims, 3 Drawing Sheets

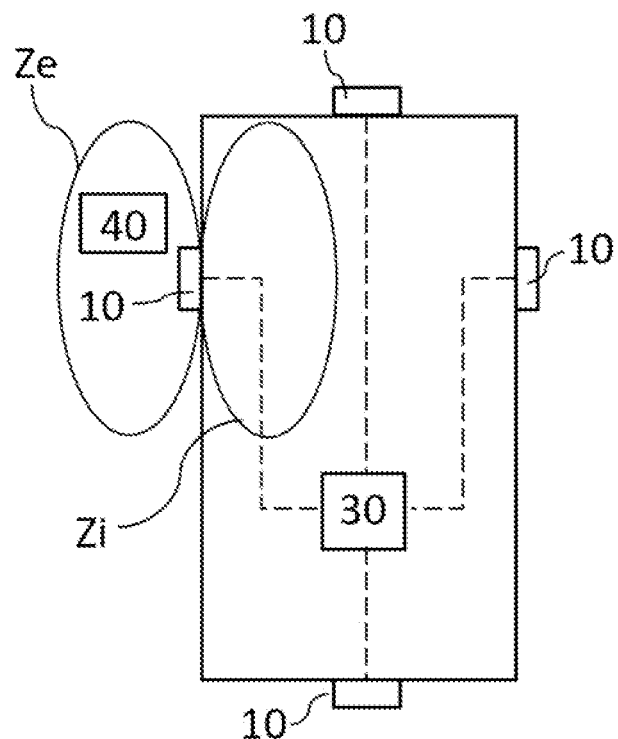
[Fig. 1]
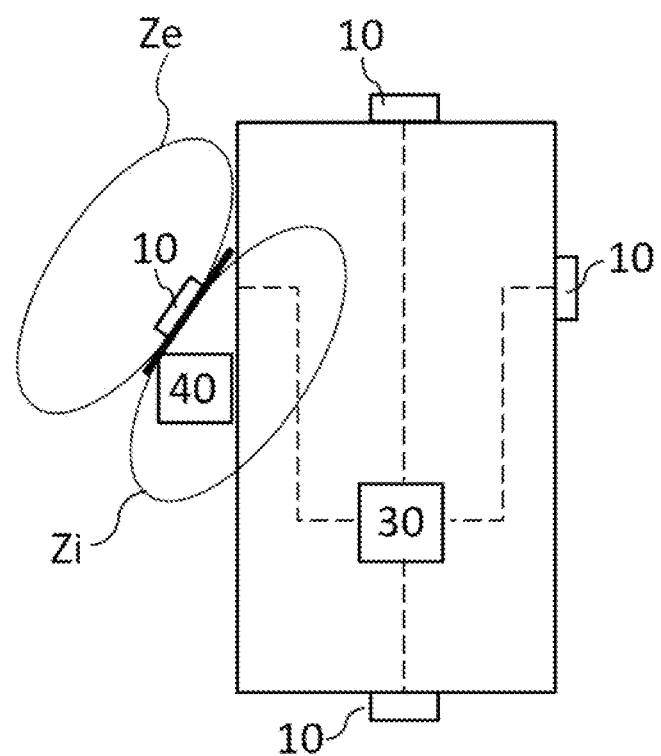
[Fig. 2]

[Fig. 3]
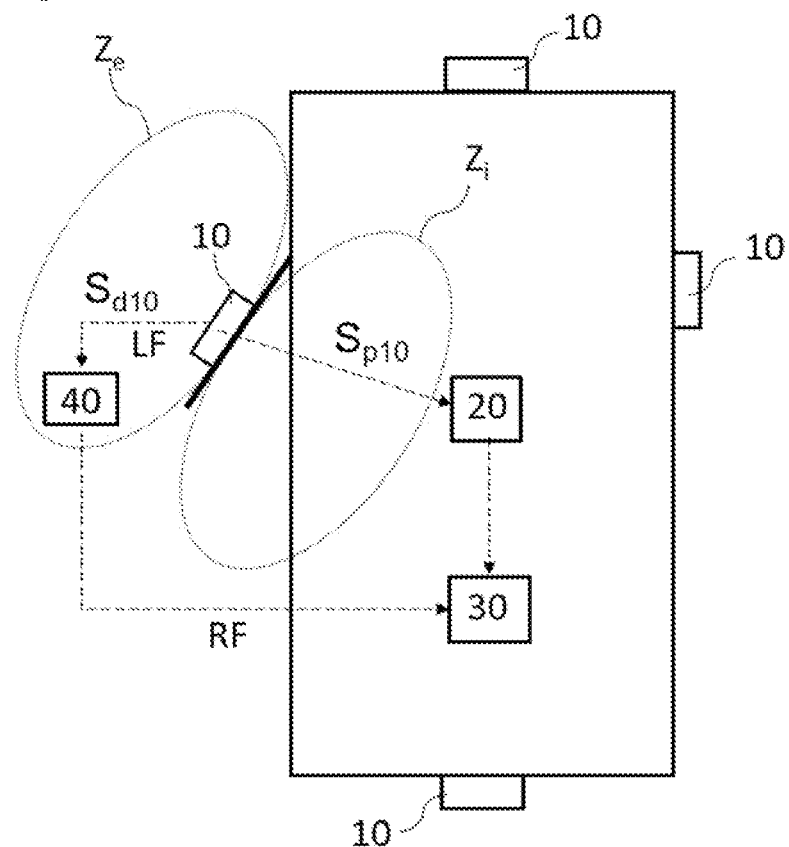
[Fig. 4]
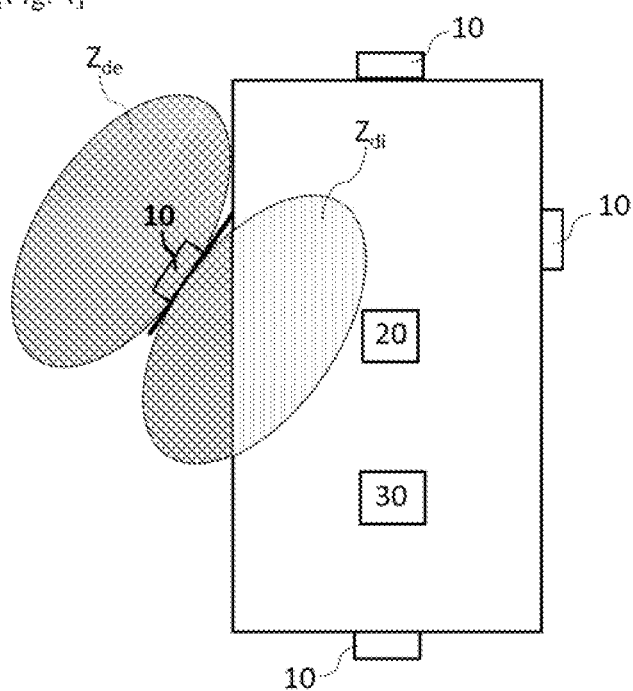

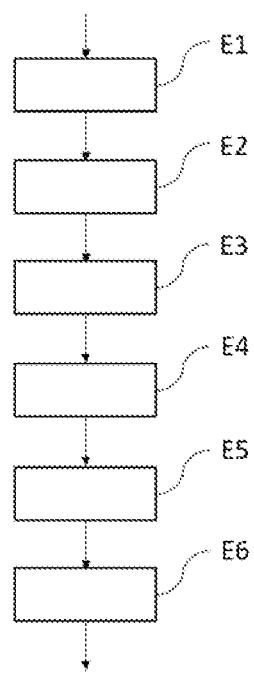
[Fig. 5]

COMPUTER FOR ACTIVATING AT LEAST ONE FUNCTION OF A MOTOR VEHICLE

CROSS REFERENCE TO RELATED APPLICATIONS

This application claims priority to French Patent Application No. 2000453, filed Jan. 17, 2020, the contents of such applications being incorporated by reference herein.

FIELD OF THE INVENTION

The invention relates to remote activation of functions of a motor vehicle, and more particularly to a method for remotely activating at least one function of a motor vehicle and to a computer allowing this method to be implemented.

BACKGROUND OF THE INVENTION

Nowadays, some motor vehicles are equipped with a detection system allowing a device carried by the user to be authenticated remotely, for example an electronic ignition key or fob, in order to implement certain functions from outside said vehicle. For example, such a detection system may be used in order to activate welcome functions (lights, adjustment of certain equipment in the passenger compartment, starting the vehicle, etc.).

In one known solution, described in FIG. 1, the detection system comprises a set of communication modules 10 and a computer 30 connected to said communication modules 10. Each communication module 10 comprises an antenna and is for example mounted in an opening element of the vehicle (door or trunk). Each antenna is characterized by a transmission zone for transmitting its electromagnetic radiation.

For a vehicle the opening elements of which are closed, this transmission zone comprises a zone Zi internal and a zone Ze external to the vehicle, each zone being associated with the activation of a welcome function of the vehicle, for example, the internal transmission zone Zi is associated with the activation of the starting of the vehicle.

Moreover, the vehicle may comprise a system for determining the degree of opening of the opening elements, making it possible to determine whether an opening element is not closed, and if it is not closed, to quantify its openness.

In a known solution, the vehicle and an authentication device 40 communicate over wireless communication links of LF/RF (Low Frequency/Radiofrequency) type. In this solution, the vehicle periodically transmits, via the antenna of each communication module 10, a detection signal over an LF communication link. When the device 40 receives this detection signal, it sends an authentication signal to the computer 30 over an RF communication link in order to authenticate itself.

In order to determine the position of the device 40 with respect to the antennas, the computer 30 of the vehicle measures the strength of the received authentication signal and deduces therefrom the position of the device 40. Thus, the computer 30 may determine whether the device 40 is positioned in the internal transmission zone Zi or external transmission zone Ze, and therefore inside, or outside, the passenger compartment of the vehicle. Notably, when the device 40 is detected in an internal transmission zone Zi, welcome functions, such as those previously described, are activated.

However, with reference to FIG. 2, when an opening element of the vehicle is open and the user holding the device 40 is in the opening of the open opening element, in other words between the open opening element and the passenger compartment of the vehicle, the device 40 is detected in the internal transmission zone Zi. In other words, since the device 40 is detected in the internal transmission zone Zi, it is considered to be inside the passenger compartment of the vehicle, and certain welcome functions of the vehicle will be activated, such as for example the starting of the engine or the switching on of the lights of the vehicle.

However, even if the device 40 is detected in the internal transmission zone Zi, it is all the same not really located inside the passenger compartment of the vehicle. Therefore, the activated welcome functions are inappropriate to the position of the device 40 with respect to the passenger compartment of the vehicle and should not have been activated.

There is therefore a need for a solution that makes it possible to overcome this drawback, at least in part.

SUMMARY OF THE INVENTION

An aspect of the invention concerns a computer for activating at least one function of a motor vehicle from a portable authentication device, said vehicle comprising:
 a plurality of opening elements,
 a plurality of communication modules, each communication module being mounted in an opening element of the vehicle and comprising an antenna characterized by an internal transmission zone and an external transmission zone, and
 a fixed reference module able to communicate with the at least one computer and with the plurality of communication modules,
said computer being characterized in that it is configured to:
 a) determine the opening position of the at least one opening element detected in the open state from the antenna position of the communication module of the at least one opening element in the open state,
 b) determine an inner detection zone of the antenna, located in the passenger compartment of the vehicle, and an outer detection zone of the antenna, located outside the passenger compartment of the vehicle, from the determined opening position of said at least one opening element in the open state and from a predefined position of the external and internal transmission zones of the antenna depending on the opening position of each opening element,
 c) determine the position of the authentication device with respect to the determined inner and outer detection zones,
 d) activate at least one function of the vehicle when the authentication device is located in the inner detection zone of said opening element.

Thus, the computer advantageously makes it possible to activate the at least one welcome function only when the device is located in the passenger compartment of the vehicle. Specifically, the definition of the inner detection zone and of the outer detection zone of the antenna being suitable for the opening position of the opening element, when the device is located in the inner detection zone, this means that said device is indeed located in the passenger compartment of the vehicle.

The computer also makes it possible to determine the opening position of each opening element. Thus, the vehicle may have no sensors specifically for quantifying the opening position of each opening element.

In a preferred manner, the fixed reference module is configured to determine the distance separating it from the antenna of said at least one opening element detected in the open state from signals transmitted by the fixed reference module and by the communication modules.

In a preferred manner, the computer is configured to determine the position of the antenna of said at least one opening element detected in the open state from the distance determined by the fixed reference module.

In an advantageous manner, the computer is configured to determine the position of the authentication device depending on the strength of an authentication signal, sent by the device, and received by the computer.

In a preferred manner, the computer comprises a memory zone in which is stored a correspondence table comprising discrete or continuous values of correspondence between the opening position of each opening element and the position of the inner detection zone and outer detection zone of said antenna.

Said correspondence table advantageously makes it possible to associate the opening position of an opening element and the position of the inner and outer detection zone of the antenna placed in said opening element.

An aspect of invention also relates to a vehicle comprising a plurality of opening elements, at least one computer as presented previously, a plurality of communication modules, each communication module being mounted in an opening element of the vehicle and comprising an antenna characterized by an internal transmission zone and an external transmission zone, and a fixed reference module able to communicate with the at least one computer and with the plurality of communication modules An aspect of invention also relates to a method for activating at least one function of a motor vehicle from a portable authentication device, said vehicle comprising:
  a plurality of opening elements,
  at least one computer, as presented previously,
  a plurality of communication modules, each communication module being mounted in an opening element of the vehicle and comprising an antenna characterized by an internal transmission zone and an external transmission zone, and
  a fixed reference module able to communicate with the at least one computer and with the plurality of communication modules,
said method, implemented by the computer, being characterized in that it comprises steps of:
  a) detecting an open state of at least one opening element,
  b) determining, with respect to the fixed reference module, the position of the antenna of said at least one opening element detected in the open state from the signals transmitted by the fixed reference module and the communication modules,
  c) determining the opening position of the at least one opening element detected in the open state from the antenna position of the communication module of the at least one opening element in the open state,
  d) determining an inner detection zone of the antenna, located in the passenger compartment of the vehicle, and an outer detection zone of the antenna, located outside the vehicle, from the determined opening position of said at least one opening element and from a predefined position of the external transmission zone and internal transmission zone of the antenna depending on the opening position of each opening element,
  e) determining the position of the authentication device depending on the determined inner and outer detection zones,
  f) activating at least one function of the vehicle when the authentication device is located in the inner detection zone of said opening element.

Thus, the method advantageously makes it possible to activate the at least one welcome function only when the device is located in the passenger compartment of the vehicle. Specifically, the definition of the inner detection zone and of the outer detection zone of the antenna being suitable for the opening position of the opening element, when the device is located in the inner detection zone, this means that said device is indeed located in the passenger compartment of the vehicle.

The method also makes it possible to determine the opening position of each opening element. Thus, the vehicle may have no sensors specifically for quantifying the opening position of each opening element.

In an advantageous manner, the step of determining the position of the antenna of said at least one opening element detected in the open state comprises:
  a) a step of sending of at least one position signal, by the communication module of the at least one open opening element, via its antenna, to the fixed reference module,
  b) a step of receiving, by the fixed reference model, of the at least one sent position signal,
  c) for each received position signal, a step of determining, by the fixed reference module, the distance separating the fixed reference module and the antenna transmitting said received position signal, from the strength of said received position signal,
  d) a step of sending the at least one determined distance to the computer,
  e) a step of receiving, by the computer, of the at least one determined distance
  f) for each received determined distance, a step of determining, by the computer, the position of the antenna from the received determined distance.

Thus, the method makes it possible to determine the position of each antenna transmitting a position signal.

Preferably, the step of determining the position of the authentication device depending on the determined inner and outer detection zones comprises:
  a) a step of sending, by the antennas, of a detection signal via an LF communication link,
  b) a step of receiving, by the authentication device, of the sent detection signal,
  c) after receiving the detection signal, a step of sending, by the authentication device, of an authentication signal via an RF communication link, to the computer,
  d) a step of determining the position of the authentication device depending on the strength of the authentication signal received by the computer.

In an advantageous manner, for a computer comprising a memory zone in which is stored a correspondence table, the correspondence table comprises discrete or continuous values of correspondence between the opening position of each opening element and the position of the inner detection zone and outer detection zone.

Said correspondence table advantageously makes it possible to associate the opening position of an opening element and the position of the inner and outer detection zone of the antenna placed in said opening element.

Further preferably, the definition, in the correspondence table, of the inner detection zones and outer detection zones of an antenna of a communication module of an opening element, is dependent on the internal and external transmission zones of said antenna.

BRIEF DESCRIPTION OF THE DRAWINGS

Other features and advantages of aspects of the invention will become more apparent upon reading the following description. This description is purely illustrative and should be read with reference to the appended drawings, in which:

FIG. 1 illustrates one embodiment of a vehicle according to the prior art,

FIG. 2 illustrates the embodiment of the vehicle illustrated in FIG. 1,

FIG. 3 illustrates a first embodiment of the vehicle according to the invention;

FIG. 4 illustrates the embodiment of the vehicle illustrated in FIG. 3,

FIG. 5 illustrates one embodiment of the method according to the invention.

DETAILED DESCRIPTION OF THE PREFERRED EMBODIMENTS

With reference to FIG. 3, one embodiment of the vehicle according to the invention will be presented.

Said vehicle notably comprises a plurality of opening elements and a system for detecting an authentication device 40 carried by a user.

The opening elements of the vehicle make it possible for a user of the vehicle to have access to the passenger compartment of the vehicle. The opening elements may be side doors, opening in a sliding or slamming manner, or else the door giving access to the trunk. Each opening element of the vehicle comprises a closing sensor, making it possible to determine whether or not said opening element is closed.

The passenger compartment of the vehicle is defined as the inside of the vehicle.

The authentication device 40 may be for example an electronic ignition key or fob. It is notably configured to send an authentication signal to a computer 30 over an RF communication link in order to authenticate itself.

The detection system therefore makes it possible to remotely authenticate a device 40 carried by the user, in order to implement certain functions from outside the vehicle. For example, such a detection system may be used in order to activate welcome functions (lights, adjustment of certain equipment in the passenger compartment, starting the vehicle, etc.)

The detection system notably comprises a plurality of communication modules 10, a fixed reference module 20 and at least one computer 30. In order to simplify the description, a detection system comprising a single computer 30 will be described. However, it is evident that said detection system may comprise more than one computer 30.

Each communication module 10 comprises an antenna and is mounted in the vehicle. For example, a communication module 10 may notably be mounted in an opening element of the vehicle, in other words, in a side door or in the door of the trunk of the vehicle. According to the embodiment presented here, one communication module 10 is mounted at the front of the vehicle, another is mounted in the right front side door, another in the left front door, and finally a last one in the door of the trunk.

The antenna is characterized by a transmission zone for transmitting its electromagnetic radiation. The transmission zone comprises an internal transmission zone 1, defined as the part of the transmission zone located inside the opening element, in other words, orientated toward the passenger compartment of the vehicle, and an external transmission zone Ze, defined as the part of transmission zone located outside the opening element, in other words, orientated toward outside the vehicle. The transmission zone is immobile with respect to the antenna, but mobile with respect to the passenger compartment of the vehicle notably when the opening element in which the antenna is mounted is open.

Moreover, with reference to FIG. 4, each position of the antenna is characterized by a detection zone for detecting the device 40, said detection zone comprising an inner detection zone $Z_{di}$ and an outer detection zone $Z_{de}$ specific to each position of the antenna. The inner detection zone $Z_{di}$ is defined as the part of the transmission zone located inside the passenger compartment and the outer detection zone $Z_{de}$ is defined as the part of the transmission zone located outside the passenger compartment.

Thus, for each unclosed opening element, each opening position of the opening element has a corresponding position specific to the internal transmission zone and to the external transmission zone Ze with respect to the passenger compartment of the vehicle, and therefore a position specific to the inner detection zone $Z_{di}$ and to the outer detection zone $Z_{de}$ with respect to the passenger compartment of the vehicle. The correspondence between the opening position of each opening element and the position of the inner detection zone $Z_{di}$ and of the outer detection zone $Z_{de}$ is stored in what is called a "correspondence" table.

Said correspondence table may comprise discrete or continuous detection zone position values depending on the opening position of an opening element.

Again with reference to FIG. 3, each communication module 10 is configured to send, via its antenna, a position signal $S_{p10}$ to the fixed reference module 20.

In addition, each communication module 10 is also configured to send, via its antenna and over an RF communication link, a detection signal $S_{d10}$, notably over an LF communication link, in order to detect whether a device 40 is located in the detection zone of said antenna.

A fixed reference module 20 is mounted in the passenger compartment of the vehicle and, notably, in a central position in the passenger compartment, such as for example in the center of the ceiling or in the central armrest of the rear or front seats of the vehicle.

According to another implementation, not shown, the detection system comprises a plurality of reference modules 20 mounted in an opening element of the vehicle, in other words, in a side door or in the door of the trunk of the vehicle, at the front of the vehicle, in the right front side door, in the left front door, and finally a last one in the door of the trunk, and a fixed communication module 10 comprising an antenna and mounted in the passenger compartment of the vehicle, and notably in a central position in the passenger compartment, such as for example in the center of the ceiling or in the central armrest of the rear or front seats of the vehicle.

According to a first embodiment, the fixed reference module 20 is configured to receive at least one position signal $S_{p10}$ sent by at least one communication module 10, via its antenna. Thus, from the strength of each received position signal $S_{p10}$, the fixed reference module 20 is configured to determine the distance separating it from the antenna transmitting each received position signal $S_{p10}$.

Each determined distance value is in addition associated with the communication module 10 comprising the antenna transmitting the position signal $S_{p10}$ used to determine the distance value.

The fixed reference module 20 is then configured to send each determined distance to the computer 30.

According to a second embodiment, said fixed reference module 20 notably makes it possible to determine the position of the antenna of the communication modules 10 of each unclosed opening element of the vehicle.

For this, the fixed reference module 20 is configured to receive at least one position signal $S_{p10}$ sent by at least one communication module 10, via its antenna. Thus, from the strength of each received position signal $S_{p10}$, the fixed reference module 20 is configured to determine the position of the antenna transmitting each received position signal $S_{p10}$.

The position of the antenna may be determined dynamically or by using a predefined correspondence table.

Dynamically, a series of calculations is performed from the value of the strength of the received position signal $S_{p10}$.

In the case of the use of a correspondence table, the fixed reference module 20 comprises a memory zone in which is stored a predefined table of correspondence between the strength of a received position signal $S_{p10}$ and the position of the antenna of the communication module 10.

Each determined position value of the antenna is in addition associated with the communication module 10 comprising said antenna.

The fixed reference module 20 is then configured to send the at least one determined antenna position value to the computer 30.

The computer 30 is also mounted in the passenger compartment of the vehicle and notably makes it possible to determine whether a device 40 is located in the inner detection zone $Z_{di}$ or in the outer detection zone $Z_{de}$ of a communication module 10.

The computer 30 also comprises a memory zone, in which is stored the previously described correspondence table, defining the position of the inner detection zone $Z_{di}$ and outer detection zone $Z_{de}$ depending on the opening position of an opening element.

The computer 30 is configured to receive at least one authentication signal, sent by the device 40, when the latter receives a detection signal $S_{d10}$ sent by a communication module 10. The authentication signal is sent via an RF communication link.

The computer 30 comprises a processor able to implement a set of instructions making it possible to perform the functions described hereinbelow.

According to the first embodiment, the computer 30 is configured to receive at least one distance determined and sent by the fixed reference module 20. In the case where the computer 30 receives a plurality of determined distance values, each value is identifiable, because it is associated with a communication module 10.

The computer 30 determines the position of the antenna from the received distance, dynamically or by using a predefined table of correspondence between the distance separating an antenna and the fixed reference module 20, and the position of the antenna of the communication module 10.

According to the second embodiment, the computer 30 is configured to receive the determined antenna position from the fixed reference module 20. In the case where the computer 30 receives a plurality of determined antenna position values, each value is identifiable, because it is associated with a communication module 10.

From each determined antenna position (received or determined directly by the computer 30), the computer 30 is configured to determine, and notably quantify, the opening position of the opening element comprising the communication module 10 associated with said determined antenna position.

The opening position of the opening element may be defined in different ways, depending on the opening type of the opening element, sliding or slamming.

The computer 30 is configured to associate the determined opening position with the position of the inner detection zone $Z_{di}$ and of the outer detection zone $Z_{de}$ by virtue of the correspondence table stored in the memory zone of said computer 30.

The computer 30 is configured to determine the position of the authentication device 40 with respect to the inner detection zone $Z_{di}$ and the outer detection zone $Z_{de}$, which are associated with the determined opening position.

Finally, the computer 30 is configured to activate a welcome function of the vehicle if the device 40 is located in an inner detection zone $Z_{di}$ of a communication module 10.

With reference to FIG. 5, one embodiment of the method according to the invention, implemented by the detection system as previously described, will now be presented.

The method comprises first of all a step E1 of detecting an unclosed state, and therefore an open state, of at least one opening element by the closing sensor of said at least one opening element.

In order to simplify the description hereinbelow, a single opening element, among the plurality of opening elements of the vehicle, is detected as being unclosed, and therefore in the open state. However, it is evident that several opening elements may be open simultaneously, and therefore the method, described hereinbelow, is performed for each opening element detected as being unclosed.

After detection of the unclosed opening element, the method then comprises a step E2 of determining the position of the antenna of the communication module 10 mounted in said unclosed opening element.

For this, first of all, the communication module 10, mounted in an unclosed opening element, sends, via its antenna, a position signal $S_{p10}$ to the fixed reference module 20.

The fixed reference module 20 then receives the position signal $S_{p10}$ sent by the communication module 10, via its antenna.

Thus, from the strength of a received position signal $S_{p10}$, the fixed reference module 20 determines the distance separating it from the antenna transmitting said received position signal $S_{p10}$.

The value of the determined distance is associated with the communication module 10 transmitting the position signal $S_{p10}$.

The fixed reference module 20 then sends the determined distance to the computer 30.

The computer 30 receives the determined distance and determines the position of the antenna from the received determined distance, dynamically or by using a predefined correspondence table.

Dynamically, a series of calculations is performed from the value of the received determined distance.

In the other case, the computer 30 comprises a memory zone in which is stored a predefined table of correspondence between the distance separating an antenna of a communication module 10 and the fixed reference module 20, and the position of the antenna.

The values of the correspondence table may be discrete or continuous.

The fixed reference module 20 receives said sent position signal $S_{p10}$ and then determines the position of the antenna transmitting the received position signal $S_{p10}$, by virtue of the table of correspondence between the strength of a received position signal $S_{p10}$ and the position of the antenna.

The values of the correspondence table may be discrete or continuous. In the case where these values are discrete, the reference module 20 selects from the correspondence table the position value of the antenna corresponding to the strength value from the correspondence table closest to the value of the strength of the received position signal $S_{p10}$. In the case where said values are continuous, the reference module 20 selects from the correspondence table the position value of the antenna corresponding to the value of the strength of the received position signal $S_{p10}$.

The determined position value is associated with the communication module 10 transmitting the position signal $S_{p10}$.

The fixed reference module 20 then sends the determined antenna position to the computer 30.

The method then comprises a step E3 of determining, by the computer 30, the opening position of the unclosed opening element associated with the determined antenna position (directly by the computer 30, or received by the computer 30).

When the opening element is a slam door, the opening position may be defined as an opening angle, and when the opening element is a sliding door, the opening position may be defined as an "opening distance".

The method then comprises a step E4 of determining the position of the inner detection zone $Z_{di}$ and of the outer detection zone $Z_{de}$ of the antenna of the communication module 10 mounted in the unclosed opening element.

The position of said inner detection zone $Z_{di}$ and of said outer detection zone $Z_{de}$ is determined by the computer 30 from the determined opening position of the unclosed opening element, and from the correspondence table, which is stored in the memory zone of the computer 30 and defined above.

If the correspondence table comprises discrete values, then the computer 30 selects from the correspondence table, for the open opening element, the opening position value closest to the determined opening position value of the unclosed opening element. Then, the computer 30 selects the position of the inner detection zone $Z_{di}$ and of the outer detection zone $Z_{de}$ corresponding to the value of the opening position selected from the correspondence table.

If the correspondence table comprises continuous values, the computer 30 selects from the correspondence table the position of the inner detection zone $Z_{di}$ and of the outer detection zone $Z_{de}$ for the value of the determined opening position.

The method then comprises a step E5 of determining the position of the authentication device 40 depending on the inner detection zone $Z_{di}$ and on the outer detection zone $Z_{de}$.

For this, the communication module 10 of the unclosed opening element sends, via its antenna, a detection signal $S_{d10}$. Said device 40 receives the sent detection signal $S_{d10}$. Once the detection signal $S_{d10}$ has been received by the device 40, said device 40 sends an authentication signal to the computer 30.

The computer 30 thus determines the position of the device 40 from the strength of the received authentication signal.

Finally, if the device 40 is positioned in the inner detection zone $Z_{di}$ of the antenna of the unclosed opening element, this means that the device 40 is located in the passenger compartment of the vehicle. This being so, the method comprises a step E6 of activating at least one welcome function of the vehicle.

The invention claimed is:

1. A computer for activating at least one function of a motor vehicle from a portable authentication device, said vehicle comprising:
   a plurality of opening elements;
   a plurality of communication modules, each communication module being mounted in an opening element of the vehicle and comprising an antenna characterized by an internal transmission zone and an external transmission zone; and
   a fixed reference module able to communicate with the at least one computer and with the plurality of communication modules,
   said computer configured to:
   a) determine the opening position of the at least one opening element detected in the open state from the antenna position of the communication module of the at least one opening element in the open state,
   b) determine an inner detection zone of the antenna, located in the passenger compartment of the vehicle, and an outer detection zone of the antenna, located outside the passenger compartment of the vehicle, from the determined opening position of said at least one opening element in the open state and from a predefined position of the external transmission zone and internal transmission zone of the antenna depending on the opening position of each opening element,
   c) determine the position of the authentication device with respect to the determined inner and outer detection zones, and
   d) activate at least one function of the vehicle when the authentication device is located in the inner detection zone of said opening element,
   wherein the fixed reference module is configured to determine the distance separating it from the antenna of said at least one opening element detected in the open state from signals transmitted by the fixed reference module and by the communication modules.

2. The computer as claimed in claim 1, configured to determine the position of the antenna of said at least one opening element detected in the open state from the distance determined by the fixed reference module.

3. The computer as claimed in claim 1, comprising a memory zone in which is stored a correspondence table comprising discrete or continuous values of correspondence between the opening position of each opening element and the position of the inner detection zone and outer detection zone of said antenna.

4. A motor vehicle comprising:
   a computer for activating at least one function of the motor vehicle from a portable authentication device;
   a plurality of opening elements;
   a plurality of communication modules, each communication module being mounted in an opening element of the vehicle and comprising an antenna characterized by an internal transmission zone and an external transmission zone; and a fixed reference module able to communicate with the at least one computer and with the plurality of communication modules, said computer configured to:

a) determine the opening position of the at least one opening element detected in the open state from the antenna position of the communication module of the at least one opening element in the open state, b) determine an inner detection zone of the antenna, located in the passenger compartment of the vehicle, and an outer detection zone of the antenna, located outside the passenger compartment of the vehicle, from the determined opening position of said at least one opening element in the open state and from a predefined position of the external transmission zone and internal transmission zone of the antenna depending on the opening position of each opening element, c) determine the position of the authentication device with respect to the determined inner and outer detection zones, and d) activate at least one function of the vehicle when the authentication device is located in the inner detection zone of said opening element, wherein the fixed reference module is configured to determine the distance separating it from the antenna of said at least one opening element detected in the open state from signals transmitted by the fixed reference module and by the communication modules.

5. A method for activating at least one function of a motor vehicle from a portable authentication device, said vehicle including a plurality of opening elements, at least one computer, a plurality of communication modules, each communication module being mounted in an opening element of the vehicle and comprising an antenna characterized by an internal transmission zone and an external transmission zone, and a fixed reference module able to communicate with the at least one computer and with the plurality of communication modules, said method comprising:

a) detecting, by the computer, an open state of at least one opening element;

b) determining, by the computer, with respect to the fixed reference module, the position of the antenna of said at least one opening element detected in the open state from the signals transmitted by the fixed reference module and the communication modules;

c) determining, by the computer, the opening position of the at least one opening element detected in the open state from the antenna position of the communication module of the at least one opening element in the open state;

d) determining, by the computer, an inner detection zone of the antenna, located in the passenger compartment of the vehicle, and an outer detection zone of the antenna, located outside the vehicle, from the determined opening position of said at least one opening element and from a predefined position of the external transmission zone and internal transmission zone of the antenna depending on the opening position of each opening element;

e) determining, by the computer, the position of the authentication device depending on the determined inner and outer detection zones; and f) activating, by the computer, at least one function of the vehicle when the authentication device is located in the inner detection zone of said opening element.

6. The method as claimed in claim 5, during which the step of determining the position of the antenna of said at least one opening element detected in the open state comprises:

a) sending of at least one position signal, by the communication module of the at least one open opening element, via its antenna, to the fixed reference module;

b) receiving, by the fixed reference module, of the at least one sent position signal;

c) for each received position signal, determining, by the fixed reference module, the distance separating the fixed reference module and the antenna transmitting said received position signal, from the power of said received position signal;

d) sending the at least one determined distance to the computer;

e) receiving, by the computer, of the at least one determined distance; and f) for each received determined distance, determining, by the computer, the position of the antenna from the received determined distance.

7. The method as claimed in claim 5, wherein determining the position of the authentication device depends on the determined inner and outer detection zones comprises:

a) sending, by the antennas, of a detection signal via an LF communication link;

b) receiving, by the authentication device, of the sent detection signal;

c) after receiving the detection signal, sending, by the authentication device, of an authentication signal via an RF communication link, to the computer; and d) determining the position of the authentication device depending on the strength of the authentication signal received by the computer.

8. The method as claimed in claim 5, for use with a computer configured to:

determine the opening position of the at least one opening element detected in the open state from the antenna position of the communication module of the at least one opening element in the open state;

determine an inner detection zone of the antenna, located in the passenger compartment of the vehicle, and an outer detection zone of the antenna, located outside the passenger compartment of the vehicle, from the determined opening position of said at least one opening element in the open state and from a predefined position of the external transmission zone and internal transmission zone of the antenna depending on the opening position of each opening element;

determine the position of the authentication device with respect to the determined inner and outer detection zone; and activate at least one function of the vehicle when the authentication device is located in the inner detection zone of said opening element, wherein the computer comprises a memory zone in which is stored a correspondence table comprising discrete or continuous values of correspondence between the opening position of each opening element and the position of the inner detection zone and outer detection zone.

9. The method as claimed in claim 8, wherein the definition, in the correspondence table, of the inner detection zone and outer detection zone of an antenna of a communication module of an opening element, is dependent on the internal and external transmission zones of said antenna.

10. A computer for activating at least one function of a motor vehicle from a portable authentication device, said vehicle comprising:
 a plurality of opening elements;
 a plurality of communication modules, each communication module being mounted in an opening element of the vehicle and comprising an antenna characterized by an internal transmission zone and an external transmission zone; and
 a fixed reference module able to communicate with the at least one computer and with the plurality of communication modules,
 said computer configured to:
  a) determine the opening position of the at least one opening element detected in the open state from the antenna position of the communication module of the at least one opening element in the open state,
  b) determine, based on the opening position of the at least one opening element:
   a first location of an inner detection zone of the antenna, located on an inner side of the at least one opening element, and
   a second location of an outer detection zone of the antenna, located on an outer side of the at least one opening element,
   wherein the first location of the inner detection zone and the second location of the outer detection zone vary depending on the opening position of the at least one opening element,
  c) determine the position of the authentication device with respect to the determined inner and outer detection zones, and
  d) activate at least one function of the vehicle when the authentication device is located in the inner detection zone of said opening element and the first location of the inner detection zone is located in a passenger compartment of the vehicle.

* * * * *